United States Patent

[11] 3,569,748

| [72] | Inventors | Hildegard M. Minchenko<br>Reynoldsburg;<br>Robert C. McMaster, Fred A. DeSaw,<br>Columbus, Ohio |
|---|---|---|
| [21] | Appl. No. | 833,100 |
| [22] | Filed | June 13, 1969 |
| [45] | Patented | Mar. 9, 1971 |
| [73] | Assignee | The Ohio State University<br>Columbus, Ohio |

[54] SONIC CURVED TRANSMISSION LINE UTILITY DEVICE
6 Claims, 5 Drawing Figs.

[52] U.S. Cl.................................................... 310/8.2,
51/59, 310/8.3, 333/72
[51] Int. Cl..................................................... H01v 7/00
[50] Field of Search............................................ 310/8.1,
8.2, 8.3, 9.1, 26; 333/30, 72; 51/57, 59

[56] References Cited
UNITED STATES PATENTS

| 3,166,840 | 1/1965 | Bancroft et al. ............. | 29/470 |
| 3,176,788 | 4/1965 | Harris.......................... | 181/29 |
| 3,475,628 | 10/1969 | McMaster et al............. | 310/8.2 |
| 3,273,146 | 9/1966 | Hurwitz......................... | 343/6.8 |
| 1,799,634 | 4/1931 | Norton.......................... | 310/8.2 |
| 3,368,085 | 2/1968 | McMaster et al............. | 310/8.3 |

Primary Examiner—Milton O. Hirshfield
Assistant Examiner—B. A. Reynolds
Attorney—Anthony D. Cennamo ABSTRACT: This invention relates generally to electromechanical transducers having a high-Q and an improved structural arrangement capable of delivering from a source—and for given lengths—extremely high power outputs with only a minimum power loss. Specifically, the transmission of ultrasonic energy is through extended curved transmission lines. At the end of the transmission line opposite to that of the power source is coupled a work function utilization device. Theoretical data is correlated with actual data for different conditions in the transmission of ultrasonic energy through extended curved transmission lines.

PATENTED MAR 9 1971　　　　　　　　　　3,569,748

INVENTORS
ROBERT C. McMASTER
HILDEGARD M. MINCHENKO
FRED A. DESAW

BY _Anthony D. Cennamo_

ATTORNEY

SONIC CURVED TRANSMISSION LINE UTILITY DEVICE

BACKGROUND

An electromechanical transducer such as a piezoelectric device is capable of transforming high frequency electrical impulses into high frequency mechanical impulses or vice versa. With an alternating-polarity input-voltage imposed on the piezoelectric elements, the transducer generates, transmits and amplifies a series of mechanical compression waves in the piezoelectric material and its metal supporting structure respectively. Considering the transducer alone, a succession of identical compression and tension waves transmitted in a transducer of proper length produces a standing wave pattern.

In a straight bar the standing wave maxima and minima locations correspond respectively to locations of maximum and minimum velocity, minimum and maximum stress, and maximum and minimum displacement on the transducer body. These locations determine optimum positions for points-of-support, steps or changes in diameter, tools or mechanical couplers, etc. The node locations on the transducer correspond to locations of minimum axial displacement and velocity, the antinode locations correspond to locations of maximum axial displacement and velocity or motion. The distance measured on the transducer between adjacent antinodes is equal to one-half wavelength at the fundamental resonance frequency, the length being dependent and variable with the shape.

There is disclosed in U.S. Pat. No. 3,368,085, for "Sonic Transducer," by Robert C. McMaster and Berndt B. Dettloff, and U.S. Pat. No. 3,396,285, for "Electromechanical Transducer," by Hildegard M. Minchenko, both assigned to The Ohio State University, sonic transducers that combine the driving element (piezoelectric) with the mechanical displacement amplifier (horn) in a novel way. These transducers are in essence a resonant horn structure excited internally close to the vibrational node. The excitation is in contrast to the external excitation common when horns are utilized in a sonic transducer system. The transducer therein disclosed is a high-Q transducer, high power, exceptionally rugged, compact, and capable of carrying continuous work loads.

In the copending application, Ser. No. 508,804, filed Nov. 19, 1965, now continuation application Ser. No. 852,980, filed Aug. 19, 1969 by Robert C. McMaster and Charles C. Libby, for "Sonic Generator," and assigned to The Ohio State University, there is disclosed a motor-generator not directed to the utilization of the generated force as a work load. The generator disclosed is directed toward the transfer of highpower energy from one point to another with high efficiency. In that application the motor generator comprises two transducers coupled at the tips of their horns. In relatively short overall lengths, the two transducers plus the transmission line connecting them must be a multiple of one-half wavelength for maximum energy transfer. In its simplest embodiment a one-half wave resonant transmission line is added between two transducers. This develops a node point of zero longitudinal displacement half way between the transducers.

In another copending application, Ser. No. 605,284, filed Dec. 28, 1966, now U.S. Pat. No. 3,475,628 for "Sonic Transducer Apparatus" by Robert C. McMaster, Charles C. Libby, and Hildegard M. Minchenko, there is disclosed means for efficiently coupling the aforementioned high-Q, high power electromechanical transducer to drive a tool effectively, i.e., to drive the tool in a work environment. The transducer horn/transmission line is impact-coupled directly to the work surface.

In still another copending application, Ser. No. 833,072, filed Jun. 13, 1969, for "Curved Sonic Transmission Line" by Robert C. McMaster, Charles C. Libby, and Hildegard M. Minchenko, and assigned to the same assignee, there is disclosed a transmission line for the transferring of energy from a high power source over selected lengths—characterized by the transmission line being nonlinear, i.e., curved, bent, etc. A significant feature of that line is that the minimum power losses occur when the bends or curvature imparted is at the antinodes of the line.

SUMMARY OF THE INVENTION

The present invention is for apparatus for the delivery of high power sonic energy to a work surface. Curved transmission lines of varying lengths are utilized. Specifically, a high-Q, high power transducer having a curved extended transmission line is coupled directly to the work area. In a preferred embodiment a work tool is coupled to the tip or end of the curved transmission line. In this way energy is utilized to perform a work function in an heretofore unaccessible area.

OBJECTS

It is accordingly a principal object of the present invention to provide an electromechanical transducer and transmission line for the delivery of high power energy to a work surface heretofore unaccessible.

It is a further object of the present invention to provide a transmission line of given lengths that is nonlinear but yet maximizes the power delivery to a work surface from a high-Q transducer.

It is another object of the present invention to provide a transmission line and attended apparatus for the delivery of high power energy to a work surface.

Other objects and features of the present invention will become apparent from the following detailed description when taken in conjunction with the drawings.

DETAILED DESCRIPTION OF DRAWINGS

Figure 2:
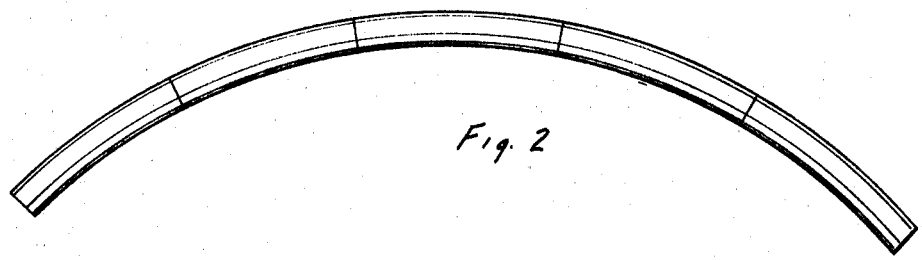
FIG. 2 is a schematic illustration of the curved sonic transmission line nodes as calculated.
Figure 3:
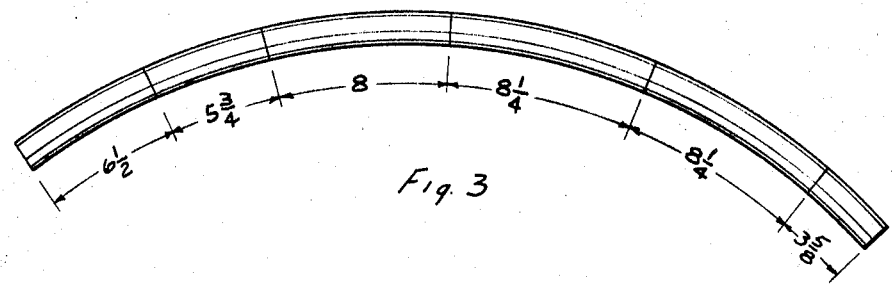
FIG. 3 is another schematic illustration of the curved transmission line nodes as measured.
Figure 1:
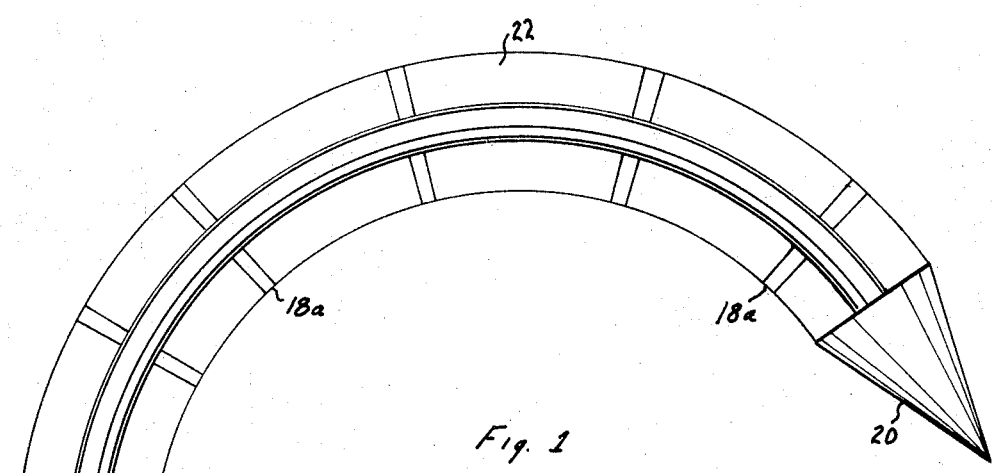
FIG. 1 is a simple schematic illustration of the sonic transducer together with a curved transmission line in a preferred embodiment of the present invention.

With reference to FIG. 1 there is shown the apparatus that comprises the preferred embodiment of the present invention. Transducer 10 is the high power, high-Q, transducer shown in U.S. Pat. No. 3,396,285, for "Electromechanical Transducer," by Hildegard M. Minchenko. Coupled to the transducer at the tip 11 is the transmission line 16. The coupling is fixed and may consist of a tap and thread fit. The transmission line 16 in this embodiment is nonlinear and follows the basic principles set forth in the copending application, Ser. No. 833,072, filed Jun. 13, 1969, by Robert C. McMaster, Charles C. Libby, and Hildegard M. Minchenko, for "Curved Sonic Transmission Line" for the transferring of energy. The present invention, however, differs from the curved line as shown in the last mentioned copending patent application, in that its function is not simply transferring energy. In this embodiment the purpose of the curved transmission line is to impart the high power sonic energy to a work surface. In this respect there is coupled to the extreme end of curved transmission line 16 a work tool 20. To minimize the frequency shift of the curved transmission line when applied to a work area, the tool 20 is impact-coupled to the line in a manner as set forth in the copending Pat. application, Ser. No. 605,284, filed Dec. 28, 1966, now U.S. Pat. No. 3,475,628 by Robert C. McMaster, Hildegard M. Minchenko, and Charles C. Libby, for "Sonic Transducer Apparatus." In certain other applications depending on the work effort and the structure of the surface, the tool may be coupled directly to the transducer without a significant loss of power. As pointed out in the aforementioned copending application, Ser. No. 508,804, now continuation application. Ser. No. 852,980 the transmission line may be several wave lengths long—and hence, several feet in length. Accordingly, to insure stability of the line, it is physically restrained from lateral movement. This restraint is accomplished by tying down the line with clamps 18a—18n to an outside shell 22 of heavy duty construction. In certain arrangements the transducer tied down to a flat board may be sufficient for the intended purpose. Since physical restraining ties are placed at the nodes of the transmission line they do not affect the transmission of energy.

It has been found that the minimum power loss of the line occurs when the bends in the line are placed at the antinodes and maximum loss of power occurs when the bends in the line are placed at the nodes. In the preferred embodiment, therefore, the bends are at the antinodes, and the clamps at the node.

The arrangement for coupling the tool 20 to the end of the transmission line 16 is described and claimed in Pat. application, Ser. No. 605,284, aforementioned, now U.S. Pat. No. 3,475,628. As pointed out therein, the transducer 10 is a resonant structure. Loading of the transducer by continuous and direct contact with a work surface will cause the frequency of the structure to shift. As a result there will be significant loss of power applied to a work piece. To overcome the shift in frequency with loading there have been three significant developments: the first, "intermittent coupling" as shown and described in Ser. No. 605,284, now U.S. Pat. No. 3,475,628; the second, angle contact of the transducer to a work surface also originally disclosed in Ser. No. 605,284, but now a divisional application thereof; the third, extended transmission lines as shown and described in U.S. Pat. application, Ser. No. 637,306, filed May 9, 1967, now continuation application Ser. No. 1957, for "Sonic Transmission Line" by Charles C. Libby and Karl F. Graff, and assigned to The Ohio State University.

Figure 4:
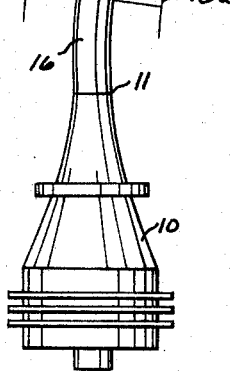
FIG. 4 illustrates a first embodiment of coupling the transmission line to the work tool.

With specific reference to FIG. 4 the work tool 20 is of a hollow-conical shape. The tip of the transmission line 16 is coupled directly to the conical work tool, such as by welding. In operation the forward and return motion of the work tool, when excited by the transducer, is in the planar direction as shown by the arrows—not parallel to the primary axis of the line 16. In this way the transducer transmission line 16 is coupled to the work tool to maintain spatial (out-of-line) relationship—as described in the aforesaid copending Pat. application — between the transmission line and tool.

Figure 5:
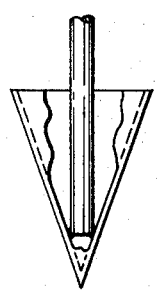
FIG. 5 illustrates a second embodiment of coupling the transmission line to the work tool.

Referring now to FIG. 5 there is shown another embodiment of coupling the transmission line to the tool. In this instance there is no direct coupling between the tip of the line and the work. The end portion of the tool 21 in this instance is of a solid material with a planar cross surface. In this way with static pressure applied to the line 16 the forward and reverse motion of the tip of the transducer causes intermittent contact between the transducer and the planar surface of the end portion of the tool.

Finally, as pointed out above, the transmission line 16 of the preferred embodiment of FIG. 1 is of multiple half-wave lengths of the resonant frequency of the transducer 10. As described in theoretical, mathematical, and experimental detail in the copending Pat. application, Ser. No. 605,284, now U.S. Pat. No. 3,475,628 aforementioned, transmission line losses are at a minimum. Therefore, in certain instances the direct coupling of the tool 20 to the tip of the transmission line 16 will not appreciably affect the transmission of power to the tool.

In most instances it has been found that a combination of an extended transmission line together with either the coupling means of FIGS. 4 or 5 yields the best results.

Although certain and specific embodiments have been shown, it is to be understood that modifications may be made without departing from the true spirit and scope of the invention.

We claim:

1. An electromechanical generator for imparting energy to a work surface comprising, a resonant piezoelectric transducer, a curved transmission line having a resonant length in half-wave equivalents to that of said transducer, and further having bends forming said curvature at the antinodes, means for joining one end of said line to said transducer at its output end, a work tool coupled to the opposite end of said line.

2. A generator as set forth in claim 1 wherein said work tool is intermittently coupled to said line.

3. A generator as set forth in claim 1 wherein the actual half-wave nodal points on said transmission line differ from the calculated nodal points.

4. A generator as set forth in claim 1 further comprising means for supporting said line and wherein said means are positioned at the nodal points on said line.

5. A generator as set forth in claim 1 further comprising means to directly couple said work tool to said line, said means maintaining spatial relationship between said line and said tool.

6. A generator as set forth in claim 1 wherein said resonant length comprises multiple half-wave equivalents.